United States Patent [19]
Hayashi et al.

[11] Patent Number: 5,790,261
[45] Date of Patent: Aug. 4, 1998

[54] COLOR CORRECTION DEVICE TO CORRECT ERRORS IN INPUT AND OUTPUT PORTIONS OF AN IMAGE DEVELOPING DEVICE AND METHOD THEREOF

[75] Inventors: Shinji Hayashi; Masayuki Mizuno; Haruo Yamamoto, all of Osaka, Japan

[73] Assignee: Mita Industrial Co., Ltd., Osaka, Japan

[21] Appl. No.: 650,438

[22] Filed: May 20, 1996

[30] Foreign Application Priority Data

May 25, 1995 [JP] Japan ................... 7-126926
May 25, 1995 [JP] Japan ................... 7-126927

[51] Int. Cl.$^6$ .............. H04N 1/00; H04N 1/46; G03F 3/08
[52] U.S. Cl. .............. 358/296; 358/504; 358/518; 358/520
[58] Field of Search .................. 358/298, 296, 358/504, 518, 520, 523, 534–536; 382/162, 167

[56] References Cited

U.S. PATENT DOCUMENTS

| | | | |
|---|---|---|---|
| 4,929,978 | 5/1990 | Kanamori et al. | 358/518 X |
| 4,970,584 | 11/1990 | Sato et al. | 358/518 |
| 4,985,759 | 1/1991 | Ito . | |
| 4,989,079 | 1/1991 | Ito | 358/518 |
| 5,105,267 | 4/1992 | Hayashi | 358/518 |
| 5,149,960 | 9/1992 | Dunne et al. . | |
| 5,185,661 | 2/1993 | Ng . | |
| 5,245,417 | 9/1993 | Hibi et al. | 358/518 X |
| 5,335,097 | 8/1994 | Murakami | 358/520 |
| 5,357,353 | 10/1994 | Hirota | 358/518 X |
| 5,461,493 | 10/1995 | Venable | 358/520 |

FOREIGN PATENT DOCUMENTS

| | | | |
|---|---|---|---|
| 378448 | 7/1990 | European Pat. Off. | H04N 1/46 |
| 635971 | 1/1995 | European Pat. Off. | H04N 1/46 |
| 2208460 | 3/1989 | United Kingdom | H04N 1/46 |
| 92/01264 | 1/1992 | WIPO . | |

*Primary Examiner*—Eric Frahm
*Attorney, Agent, or Firm*—Beveridge, DeGrandi, Weilacher & Young, LLP

[57] ABSTRACT

A color correcting device and a color correcting method in an image forming apparatus such as a color copying machine that rely on, a correction factor in a masking equation which is previously found for each predetermined hue range. It is judged which of a plurality of predetermined hue ranges corresponds to a hue corresponding to input data composed of color data in a plurality of colors. The input data is subjected to color correction using a masking equation using a correction factor corresponding to the judged hue range.

9 Claims, 11 Drawing Sheets

५,७९०,२६१

COLOR CORRECTION DEVICE TO CORRECT ERRORS IN INPUT AND OUTPUT PORTIONS OF AN IMAGE DEVELOPING DEVICE AND METHOD THEREOF

BACKGROUND OF THE INVENTION

1. Field of the Invention

The present invention relates to a color correcting device and a color correcting method in an image forming apparatus such as a color copying machine.

2. Description of the Prior Art

In a color copying machine, a color image is optically read from an original by a CCD (Charge Coupled Device) scanner, and is converted into signals corresponding to the three primary colors (additive), red (R), green (G) and blue (B). The R, G and B signals are converted into data representing the three primary colors (subtractive), cyan (C), magenta (M) and yellow (Y).

Each of the C, M and Y data is 8-bit data represented at 256 gray levels. Black data Bk is generated on the basis of the C, M and Y data. The gray level of each of the C, M and Y data and the black data Bk is corrected (subjected to color correction) depending on the characteristics of a color filter and toner.

Development is performed on the basis of the C, M and Y data and the black data Bk finally obtained. Specifically, the surface of a photoreceptor is first scanned by a laser beam modulated on the basis of the C data, and an electrostatic latent image corresponding to cyan is formed on the surface of the photoreceptor. The electrostatic latent image is developed into a toner image using cyan toner, and the toner image is transferred to paper. Similarly, toner images in respective colors, i.e., magenta, yellow and black are formed on the surface of the photoreceptor and are transferred to paper so as to correspond to the M and Y data and the black data Bk.

Description is made of color correction. In a color copying machine, hues must be as identical as possible between a color image on an original and a copied image obtained. However, hues of cyan toner, magenta toner and yellow toner used for reproducing hues are not hues of pure cyan, magenta and yellow but are slightly muddy. Even if the C, M and Y data are simply obtained on the basis of an output of the CCD scanner, therefore, the hues cannot be satisfactorily reproduced.

FIG. 5 illustrates characteristics of reflectance in a case where an image in magenta which is the complementary color of green is formed on paper. Ideal characteristics of reflectance corresponding to pure magenta are as indicated by a curve L1 in FIG. 5. That is, light is not absorbed in a blue wavelength region $\lambda B$ and a red wavelength region $\lambda R$, and light in a green wavelength region $\lambda G$ is completely absorbed.

However, characteristics of reflectance in a case where actual magenta toner is used are as indicated by a curve L2. That is, in a case where the actual magenta toner is used, light is absorbed even in the blue wavelength region $\lambda B$ and the red wavelength region $\lambda R$, as indicated by the oblique hatching in FIG. 5.

In order to correct undesirable absorption, color correction is made. This color correction is generally made using a masking equation given by the following equation (1):

$$\begin{pmatrix} C_{out} \\ M_{out} \\ Y_{out} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} C_{in} \\ M_{in} \\ Y_{in} \end{pmatrix} \quad (1)$$

In the equation (1), $C_{in}$, $M_{in}$ and $Y_{in}$ are C, M and Y data before the correction, and $C_{out}$, $Y_{out}$ and $Y_{out}$ are C, M and Y data after the color correction. $\alpha_{ij}$ (i=1, 2, 3, j=1, 2, 3) is a correction factor.

As described above, in a color copying machine, various types of colors are reproduced by cyan toner, magenta toner and yellow toner. FIG. 3 illustrates the range of color reproduction by identical toner in a CIE-L*a*b* space. In FIG. 3, a hue corresponding to an angle of 0° is reproduced by only yellow toner, a hue corresponding to an angle of 120° is reproduced by only magenta toner, and a hue corresponding to an angle of 240° is reproduced by only cyan toner.

Furthermore, a hue corresponding to an angle between 0° and 120° is reproduced by mixing the yellow toner and the magenta toner. Similarly, a hue corresponding to an angle between 120° and 240° is reproduced by mixing the magenta toner and the cyan toner. A hue corresponding to an angle between 240° and 0° is reproduced by mixing the cyan toner and the yellow toner.

FIG. 4 illustrates the range of color reproduction by actual toner in a CIE-L*a*b* space.

For example, when yellow toner is mixed with actual magenta toner itself, the color reproduction range of magenta deviates in the direction of yellow, as shown in FIG. 4. When cyan toner is mixed with actual yellow toner itself, the color reproduction range of yellow deviates in the direction of cyan, as shown in FIG. 4. When yellow toner is mixed with actual cyan toner itself, the color reproduction range of cyan deviates in the direction of yellow, as shown in FIG. 4.

In a case where the yellow toner is mixed with the actual magenta toner itself, when a hue corresponding to M data $M_{in}$ obtained, taking toner as ideal toner is represented by a point $\alpha$ in FIG. 3, a hue obtained by outputting the data $M_{in}$ as it is becomes a hue represented by a point $\beta$ in FIG. 4. That is, the obtained hue is reproduced as a color in which yellow is mixed with magenta. Consequently, color correction must be so made that the obtained hue is represented by the point $\alpha$.

Such color correction has been conventionally made, considering that all the dimensions and the directions of deviation Sc of color reproducibility between the actual cyan toner and the ideal toner, deviation Sm of color reproducibility between the actual magenta toner and the ideal toner, and deviation Sy of color reproducibility between the actual yellow toner and the ideal toner are uniform.

However, all the dimensions and the directions of the deviation Sc of color reproducibility between the actual cyan toner and the ideal toner, the deviation Sm of color reproducibility between the actual magenta toner and the ideal toner, and the deviation Sy of color reproducibility between the actual yellow toner and the ideal toner are not necessarily uniform, as shown in FIG. 4. Consequently, in the conventional color correction, good color reproducibility has not been obtained.

Furthermore, in the conventional color correction processing, the characteristics of a scanner and the characteristics of a printer have been together corrected. Even when only one of the scanner and the printer is changed, therefore, the correction factor must be so adjusted that both the characteristics of the scanner and the characteristics of the printer are corrected, whereby the work is laborious.

SUMMARY OF THE INVENTION

An object of the present invention is to provide a color correcting method and a color correcting device, in which color reproducibility can be improved.

Another object of the present invention is to provide a color correcting device and a color correcting method, in which an adjustment for color correction is simplified in a case where only one of an input device such as a scanner and an output device such as a printer is changed.

A first color correcting device according to the present invention is a color correcting device for subjecting input data composed of color data in a plurality of colors to color correction using a masking equation, which is characterized by comprising means for previously finding a correction factor in the masking equation for each predetermined hue range, means for judging which of a plurality of predetermined hue ranges corresponds to a hue corresponding to the input data, and means for subjecting the input data to color correction using the masking equation using the correction factor corresponding to the judged hue range.

The hue corresponding to the input data is found by subjecting the input data to L*a*b* conversion.

A first color correcting method according to the present invention is a color correcting method in which input data composed of color data in a plurality of colors is subjected to color correction using a masking equation, which is characterized by comprising the steps of previously finding a correction factor in the masking equation for each predetermined hue range, judging which of a plurality of predetermined hue ranges corresponds to a hue corresponding to the input data, and subjecting the input data to color correction using the masking equation using the correction factor corresponding to the judged hue range.

The hue corresponding to the input data is found by subjecting the input data to L*a*b* conversion.

In the first color correcting device or the first color correcting method according to the present invention, the correction factor in the masking equation is previously found for each predetermined hue range. It is judged which of the plurality of predetermined hue ranges corresponds to the hue corresponding to the input data composed of the color data in a plurality of colors. The input data is subjected to color correction using the masking equation using the correction factor corresponding to the judged hue range. Consequently, it is possible to improve the color reproducibility.

A second color correcting device according to the present invention is characterized by comprising input device characteristics correcting means for converting input data composed of color data in a plurality of colors obtained from an input device into reference data representing an actual color on the basis of the characteristics of the input device, and output device characteristics correcting means for converting the reference data into output data composed of color data in a plurality of colors on the basis of the characteristics of an output device.

Examples of the input device characteristics correcting means include one for converting the input data obtained from the input device into L*a*b* data whose error caused by the characteristics of the input device is corrected on the basis of a conversion expression previously found by experiments, and examples of the output device characteristics correcting means include one for converting the L*a*b* data obtained from the input device characteristics correcting means into output data composed of color data in a plurality of colors whose error caused by the characteristics of the output device is corrected on the basis of the conversion expression previously found by experiments.

Examples of the input device characteristics correcting means include one comprising first converting means for converting the input data obtained from the input device into L*a*b* data corresponding thereto, and second converting means for converting the saturation of a color represented by the L*a*b* data obtained by the first converting means into saturation whose error caused by the characteristics of the input device is corrected on the basis of the color reproduction range characteristics of the input device, and examples of the output device characteristics correcting means include one comprising third converting means for converting the saturation of the color represented by the L*a*b* data obtained by the input device characteristics correcting means into saturation within the color reproduction range of the output device on the basis of the color reproduction range characteristics of the output device, and fourth converting means for converting the L*a*b* data obtained by the third converting means into output data composed of color data in a plurality of colors corresponding thereto.

Examples of the input device characteristics correcting means include one for converting the input data obtained from the input device into L*a*b* data whose error caused by the characteristics of the input device is corrected on the basis of a conversion expression previously found by experiments, and examples of the output device characteristics correcting means include one comprising first converting means for converting the saturation of a color represented by the L*a*b* data obtained by the input device characteristics correcting means into saturation within the color reproduction range of the output device on the basis of the color reproduction range characteristics of the output device, and second converting means for converting the L*a*b* data obtained by the first converting means into output data composed of color data in a plurality of colors corresponding thereto.

Examples of the input device characteristics correcting means include one comprising first converting means for converting the input data obtained from the input device into L*a*b* data corresponding thereto, and second converting means for converting the saturation of a color represented by the L*a*b* data obtained by the first converting means into saturation whose error caused by the characteristics of the input device is corrected on the basis of the color reproduction range characteristics of the input device, and examples of the output device characteristics correcting means include one for converting the L*a*b* data obtained from the input device characteristics correcting means into output data composed of color data in a plurality of colors whose error caused by the characteristics of the output device is corrected on the basis of a conversion expression previously found by experiments.

A second color correcting method according to the present invention is characterized by comprising an input device characteristics correcting step of converting input data composed of color data in a plurality of colors obtained from an input device into reference data representing an actual color on the basis of the characteristics of the input device, and an output device characteristics correcting step of converting the reference data into output data composed of color data in a plurality of colors on the basis of the characteristics of an output device.

Examples of the input device characteristics correcting step include one of converting the input data obtained from the input device into L*a*b* data whose error caused by the characteristics of the input device is corrected on the basis of a conversion expression previously found by experiments, and examples of the output device characteristics correcting step include one of converting the L*a*b* data obtained in the input device characteristics correcting step into output data composed of color data in a plurality of colors whose error caused by the characteristics of the output device is corrected on the basis of the conversion expression previously found by experiments.

Examples of the input device characteristics correcting step include one comprising a first step of converting the input data obtained from the input device into L*a*b* data corresponding thereto, and a second step of converting the saturation of a color represented by the L*a*b* data obtained in the first step into saturation whose error caused by the characteristics of the input device is corrected on the basis of the color reproduction range characteristics of the input device, and examples of the output device characteristics correcting step include one comprising a third step of converting the saturation of the color represented by the L*a*b* data obtained in the input device characteristics correcting step into saturation within the color reproduction range of the output device on the basis of the color reproduction range characteristics of the output device, and a fourth step of converting the L*a*b* data obtained in the third step into output data composed of color data in a plurality of colors corresponding thereto.

Examples of the input device characteristics correcting step include one of converting the input data obtained from the input device into L*a*b* data whose error caused by the characteristics of the input device is corrected on the basis of a conversion expression previously found by experiments, and examples of the output device characteristics correcting step include one comprising a first step of converting the saturation of a color represented by the L*a*b* data obtained in the input device characteristics correcting step into saturation within the color reproduction range of the output device on the basis of the color reproduction range characteristics of the output device, and a second step of converting the L*a*b* data obtained in the first step into output data composed of color data in a plurality of colors corresponding thereto.

Examples of the input device characteristics correcting step include one comprising a first step of converting the input data obtained from the input device into L*a*b* data corresponding thereto, and a second step of converting the saturation of a color represented by the L*a*b* data obtained in the first step into saturation whose error caused by the characteristics of the input device is corrected on the basis of the color reproduction range characteristics of the input device, and examples of the output device characteristics correcting step include one of converting the L*a*b* data obtained in the input device characteristics correcting step into output data composed of color data in a plurality of colors whose error caused by the characteristics of the output device is corrected on the basis of a conversion expression previously found by experiments.

In the second color correcting device or the second color correcting method according to the present invention, the input data composed of the color data in a plurality of colors obtained from the input device is converted into reference data representing the actual color on the basis of the characteristics of the input device. The obtained reference data is converted into the output data composed of the color data in a plurality of colors on the basis of the characteristics of the output device.

In the second color correcting method or the second color correcting device according to the present invention, the color reproduction range is corrected on the basis of the characteristics of the input device such as a scanner, whereby the color reproducibility is improved. Further, the color reproduction range is corrected on the basis of the characteristics of the output device such as a printer is corrected, whereby the representation of the saturation of the color linearly corresponds to the saturation of the inputted color. Specifically, when the saturation of the inputted color exceeds the color reproduction range of the output device, colors having the same saturation have been conventionally outputted irrespective of the saturation of the inputted color. Even when the saturation of the inputted color exceeds the color reproduction range of the output device in the present invention, however, colors having different saturation can be outputted depending on the saturation of the inputted color. Therefore, the color reproducibility is improved.

In a case where only one of the input device such as a scanner and the output device such as a printer is changed, an adjustment for color correction is simplified. According to the present invention, color correction can be simply made with respect to various combinations of the input device such as a scanner and the output device such as a printer.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
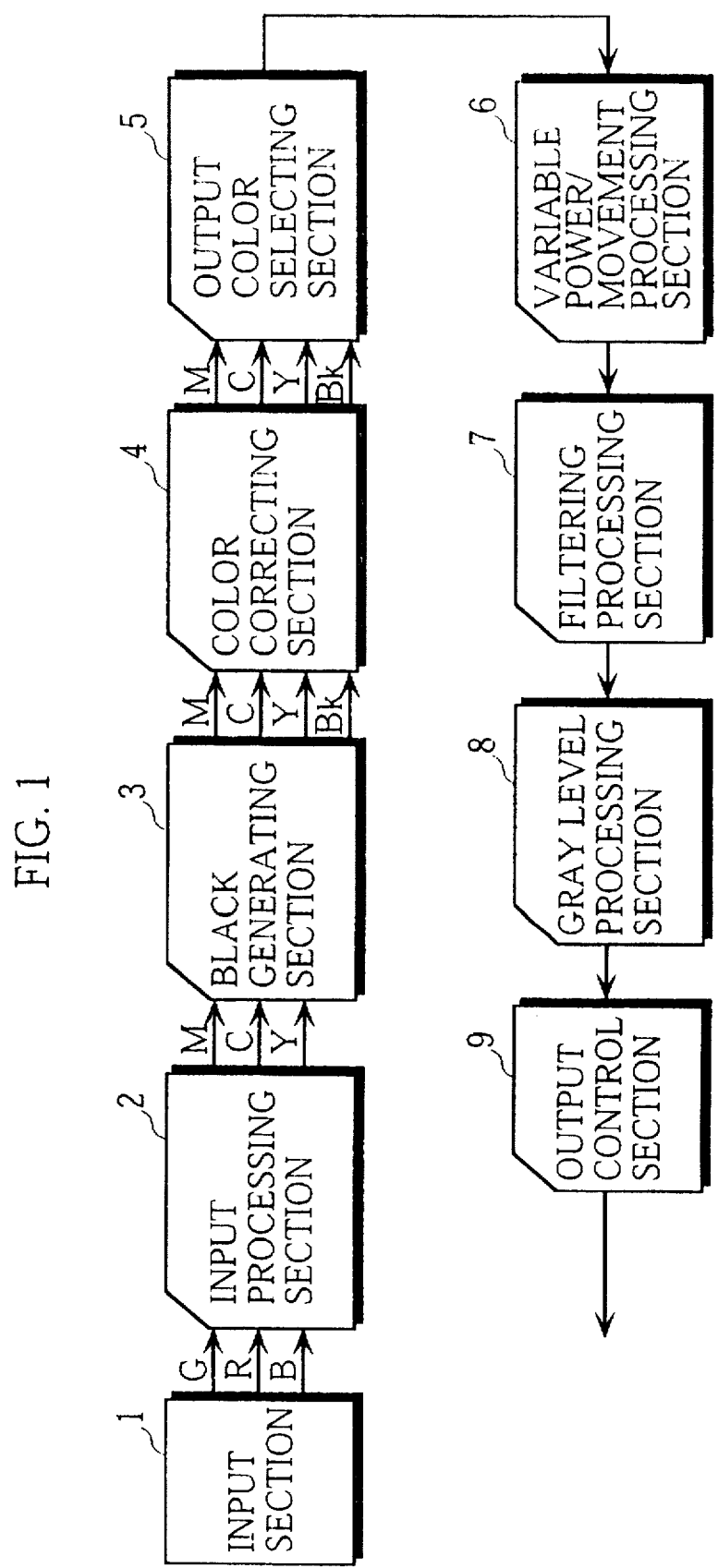
FIG. 1 is a block diagram showing the entire construction of a digital color copying machine according to a first embodiment.

Referring now to the drawings, description is made of embodiments in a case where the present invention is applied to a digital color copying machine.

|1| Description of First Embodiment

A first embodiment of the present invention will be first described on the basis of FIGS. 1 to 5.

FIG. 1 illustrates the entire electrical construction of a digital color copying machine.

In the digital color copying machine, an original is irradiated by an exposure lamp in an input section 1 comprising a scanner section or the like, and its reflected light is detected by a CCD and is successively converted into an electric signal. In this case, an image of the original is decomposed into colors and is decomposed into pixels by the CCD, whereby the image is decomposed into electric signals corresponding to the respective densities of the pixels. The electric signal is digitally converted, after which a density signal is outputted for each color (B, G, R).

In an input processing unit 2, the variation of the CCD, the exposure lamp, or the like is corrected for each of the signals corresponding to the respective colors (B, G, R), after which the signals corresponding to the respective colors (BGR signals) are converted into toner density signals (YMC signals). A Bk signal is generated from the YMC signals by a black generating section 3.

Thereafter, the density level of each of the colors corresponding to the YMC signals and the Bk signal is corrected depending on the characteristics of a filter and toner by a color correcting section 4.

The YMC signals and the Bk signal after the color correction are sent to an output color selecting section 5. In the output color selecting section 5, M, C, Y and Bk data after the color correction are selected in this order, and are outputted.

The data outputted from the output color selecting section 5 is sent to a variable power/movement processing section 6 for performing variable power/movement processing in the direction of horizontal scanning of the image, and is then sent to a filtering processing section 7. In the filtering processing section 7, processing such as processing for facilitating the separation of a binary image region and a halftone image region is performed.

The data after the filtering processing is sent to a gray level processing section 8. In the gray level processing section 8, halftone processing using a dither matrix, for example, is performed. The data which is subjected to the halftone processing is sent to an output control section 9. In the output control section 9, a video signal corresponding to input data, for example, is generated. The video signal is sent to a laser scanning unit (not shown).

Figure 2:
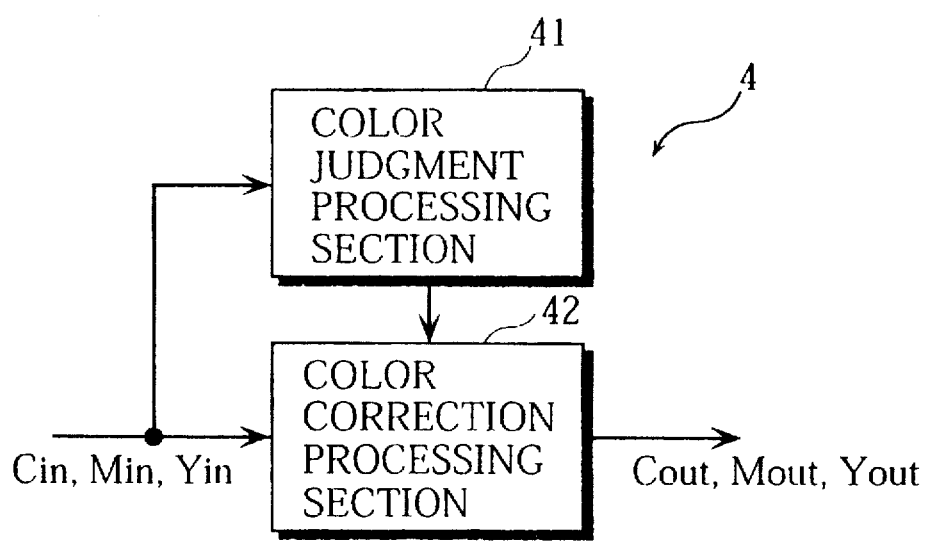
FIG. 2 is a block diagram showing the structure of a color correcting section.

FIG. 2 illustrates the structure of the color correcting section 4.

C, M and Y data inputted to the color correcting section 4 are sent to a color judgment processing section 41, and is sent to a color correction processing section 42.

In the color judgment processing section 41, the inputted C, M and Y data Cin, Min and Yin are first converted into L*, a* and b* data. The CMY-L*a*b* conversion is made on the basis of the following equation (2):

$$L = \alpha_1 C_{in} + \beta_1 M_{in} + \gamma_1 Y_{in} + \delta_1 C_{in} M_{in} + \epsilon_1 M_{in} Y_{in} + \zeta_1 C_{in} Y_{in}$$

$$a = \alpha_2 C_{in} + \beta_2 M_{in} + \gamma_2 Y_{in} + \delta_2 C_{in} M_{in} + \epsilon_2 M_{in} Y_{in} + \zeta_2 C_{in} Y_{in}$$

$$b = \alpha_3 C_{in} + \beta_3 M_{in} + \gamma_3 Y_{in} + \delta_3 C_{in} M_{in} + \epsilon_3 M_{in} Y_{in} + \zeta_3 C_{in} Y_{in} \quad (2)$$

In the foregoing equation (2), $\alpha_i$, $\beta_i$, $\gamma_i$, $\delta_i$, $\epsilon_i$, and $\zeta_i$ (i=1, 2, 3) are set constants, the respective values of which are determined by the following experiments, for example. A standard original specified by L*, a* and b* (e.g., Color Target original conforming to ANSI IT8, 7/3-1993 or an original specified by L*, a* and b* measured using a color difference meter is read by a scanner. Each set of C, M and Y data thus obtained and L*, a* and b* corresponding thereto in the standard original are substituted into a conversion expression given by the foregoing equation (2), to find the best coefficients in the conversion expression using the method of least squares.

The C, M and Y data Cin, Min and Yin are converted into the L*, a* and b* data on the basis of the equation (2), after which it is judged from a and b found which of predetermined six ranges corresponds to a hue corresponding to the C, M and Y data.

Figure 3:
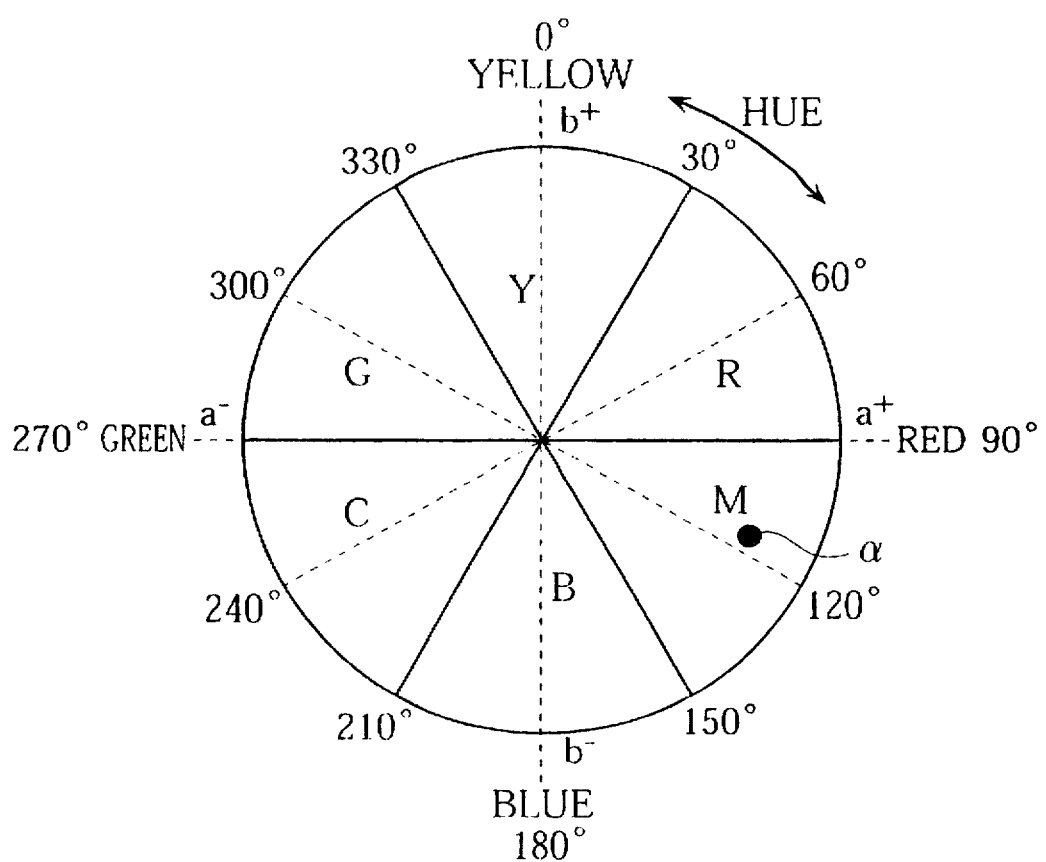
FIG. 3 is a typical diagram showing the range of color reproduction by ideal toner.

In FIG. 3, the range of a hue is divided into six ranges for each angle of 30° to 60°, whereby six hue ranges are previously set. Each of the hue ranges is as follows when the hue is represented by an angle $\theta$ in the clockwise direction from an angle of 0° in FIG. 3:

First hue range (R): $30° < \theta \leq 90°$

Second hue range (M): $90° < \theta \leq 150°$

Third hue range (B): $150° < \theta \leq 210°$

Fourth hue range (C): $210° < \theta \leq 270°$

Fifth hue range (G): $270° < \theta \leq 330°$

Sixth hue range (Y): $330° < \theta \leq 30°$

Specifically, $\theta$ is found on the basis of the following equation (3) from a* and b* found in the foregoing equation (2). It is judged which of the first to sixth hue ranges corresponds to the hue on the basis of $\theta$ found:

$$\theta = \tan^{-1}(a/b) \quad (3)$$

The color correction processing section 42 subjects the input data $C_{in}$, $M_{in}$ and $Y_{in}$ to color conversion using a masking equation having a correction factor corresponding to the hue range. The masking equation is given by the following equation (4):

$$\begin{pmatrix} C_{out} \\ M_{out} \\ Y_{out} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} C_{in} \\ M_{in} \\ Y_{in} \end{pmatrix} \quad (4)$$

In the equation (4), $C_{in}$, $M_{in}$ and $Y_{in}$ are input data, and $C_{out}$, $M_{out}$ and $Y_{out}$ are output data. $\alpha_{ij}$ (i=1, 2, 3, j=1, 2, 3) is a correction factor, the value of which is previously determined by experiments for each of the first to sixth hue ranges. That is, six sets of correction factors $\alpha_{ij}$ (i=1, 2, 3, j=1, 2, 3) are prepared so as to correspond to the first to sixth hue ranges. The input data $C_{in}$, $M_{in}$ and $Y_{in}$ are subjected to color correction using the set of correction factors $\alpha_{ij}$ (i=1, 2, 3, j=1, 2, 3) corresponding to the hue range determined by the color judgment processing section 41.

Figure 4:
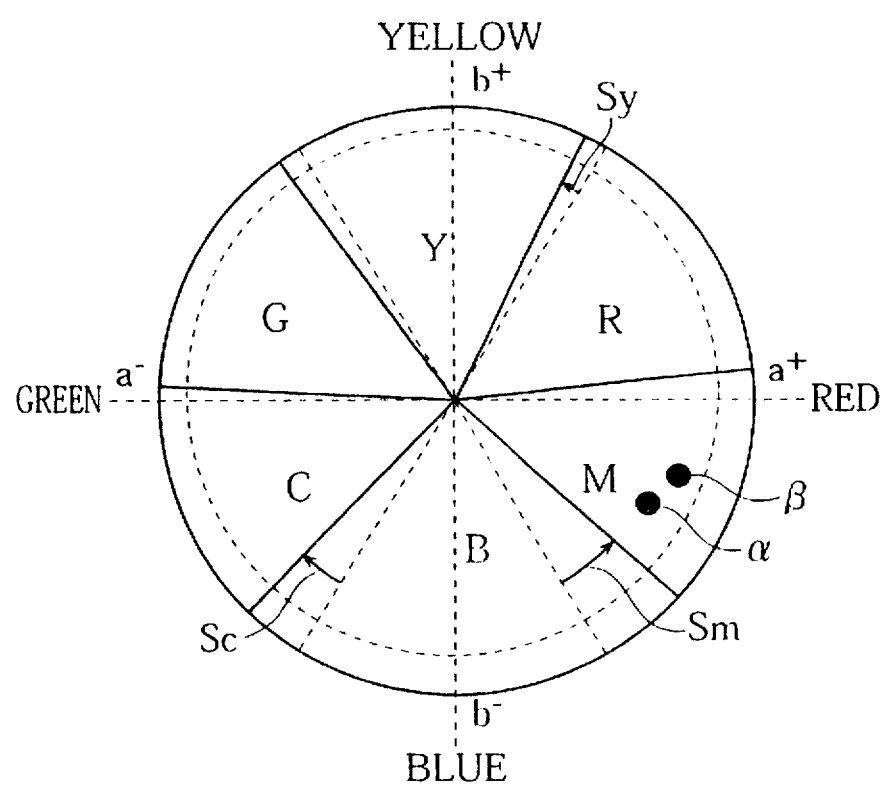
FIG. 4 is a typical diagram showing the range of color reproduction by actual toner.
Figure 5:
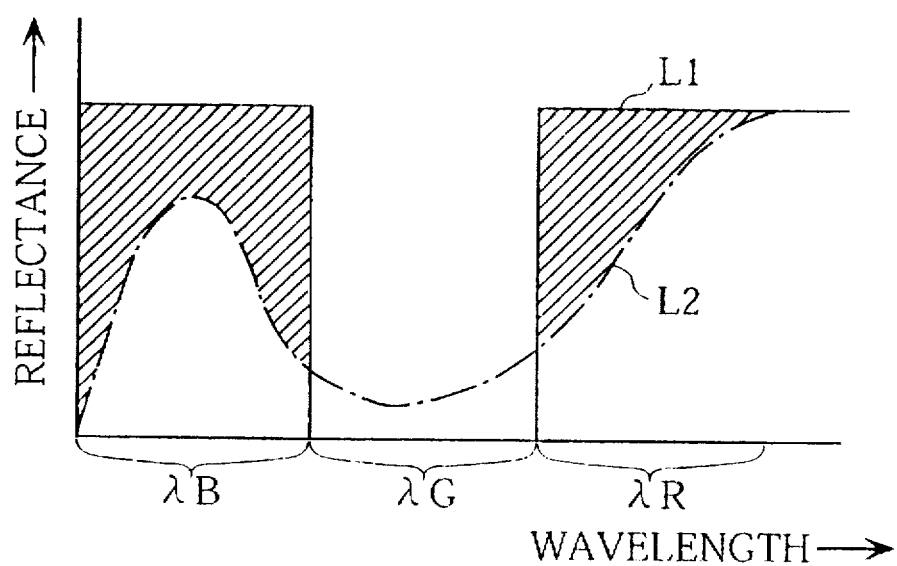
FIG. 5 is a graph showing characteristics of light reflectance of magenta toner.

The correction factor in the masking equation is thus set for each hue range. Even if the dimensions and the directions of deviation Sc of color reproducibility between actual cyan toner and ideal toner, deviation Sm of color reproducibility between actual magenta toner and ideal toner, and deviation Sy of color reproducibility between actual yellow toner and ideal toner differ, as shown in FIG. 4, therefore, it is possible to obtain good color reproducibility.

[2] Description of Second Embodiment

A second embodiment of the present invention will be described with reference to FIGS. 6 to 11.

Figure 6:
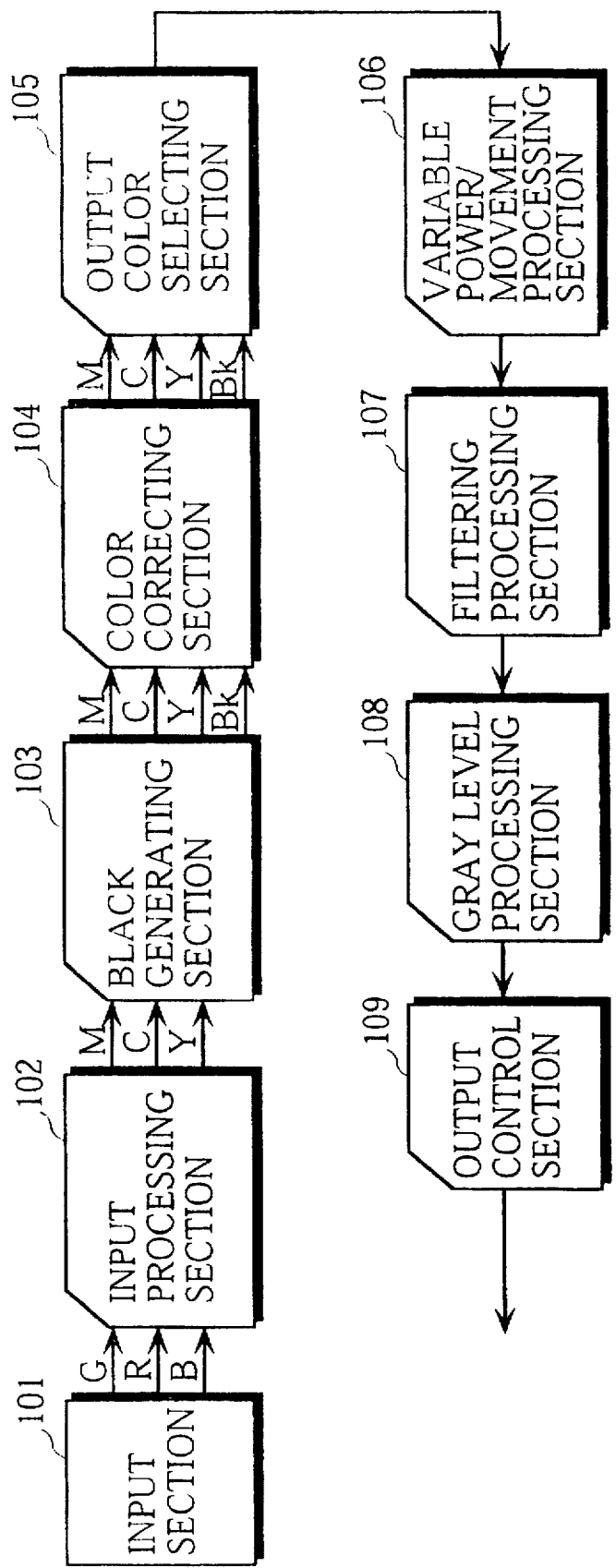
FIG. 6 is a block diagram showing the entire construction of a digital color copying machine according to a second embodiment.

FIG. 6 illustrates the entire electrical construction of a digital color copying machine.

In the digital color copying machine, an original is irradiated by an exposure lamp in an input section 101 comprising a scanner section or the like, and its reflected light is detected by a CCD and is successively converted into an electric signal. In this case, an image of the original is decomposed into colors and is decomposed into pixels by the CCD, whereby the image is decomposed into electric signals corresponding to the respective densities of the pixels. The electric signal is digitally converted, after which a density signal is outputted for each color (B, G, R).

In an input processing unit 102, the variation of the CCD, the exposure lamp, or the like is corrected for each of the signals corresponding to the respective colors (B, G, R), after which the signals corresponding to the respective colors (BGR signals) are converted into toner density signals (YMC signals). A Bk signal is generated from the YMC signals by a black generating section 103.

Thereafter, the density level of each of the colors corresponding to the YMC signals and the Bk signal is corrected depending on the characteristics of a filter and toner by a color correcting section 104.

The YMC signals and the Bk signal after the color correction are sent to an output color selecting section 105. In the output color selecting section 105, M, C, Y and Bk data after the color correction are selected in this order, and are outputted.

The data outputted from the output color selecting section 105 is sent to a variable power/movement processing section 106 for performing variable power/movement processing in the direction of horizontal scanning of the image, and is then sent to a filtering processing section 107. In the filtering processing section 107, processing such as processing for facilitating the separation of a binary image region and a halftone image region is performed.

The data after the filtering processing is sent to a gray level processing section 108. In the gray level processing section 108, halftone processing using a dither matrix, for example, is performed. The data which is subjected to the halftone processing is sent to an output control section 109. In the output control section 109, a video signal corresponding to input data, for example, is generated. The video signal is sent to a laser scanning unit (not shown).

Figure 7:
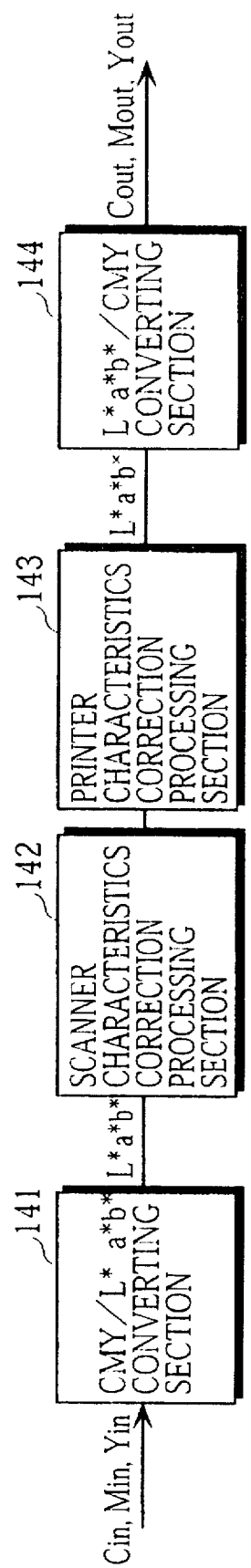
FIG. 7 is a block diagram showing the structure of a color correcting section.

FIG. 7 illustrates the structure of the color correcting section 104.

C, M and Y data $C_{in}$, $M_{in}$ and $Y_{in}$ inputted to the color correcting section 104 are sent to a CMY/L*a*b* converting section 141. In the CMY/L*a*b* converting section 141, the input data $C_{in}$, $M_{in}$ and $Y_{in}$ are converted into L*, a* and b** data corresponding thereto. The obtained L*, a* and b* data are sent to a scanner characteristics correction processing section 142.

Figure 8:
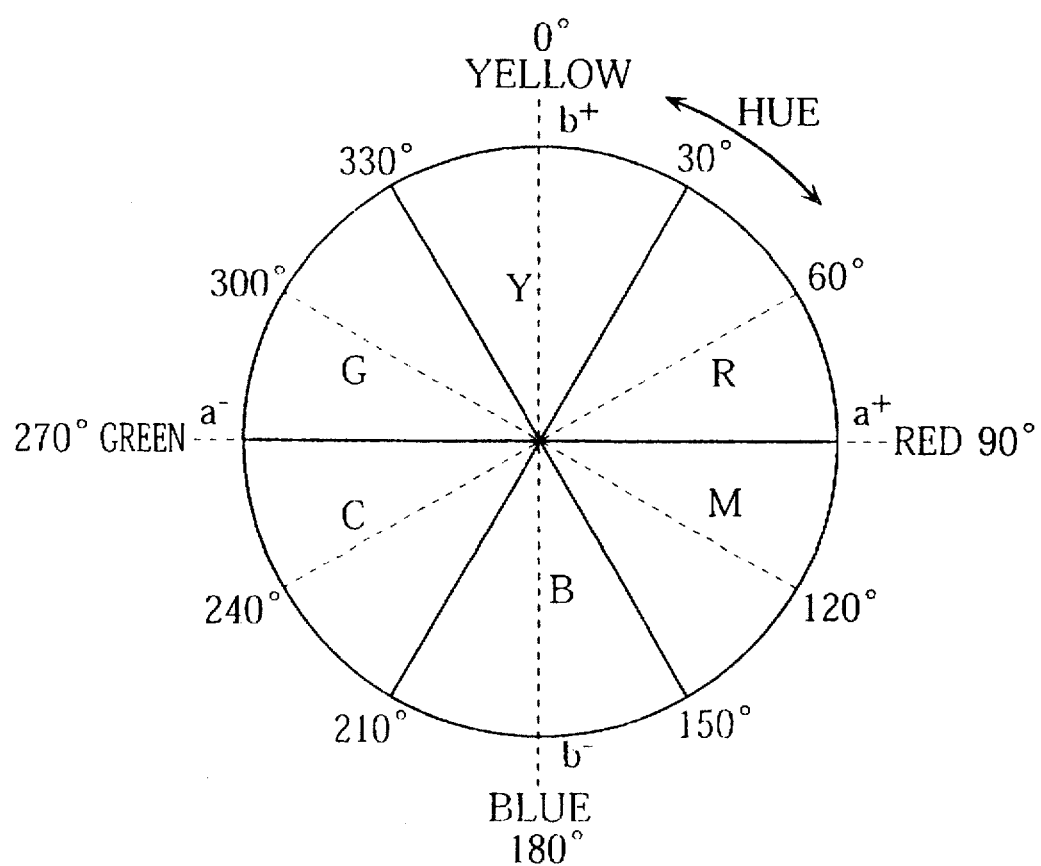
FIG. 8 is a typical diagram showing the reference color reproduction range in an L*a*b* space.

FIG. 8 is a chromaticity diagram in a CIE-L*a*b* space, which illustrates the reproduction range of colors existing in the natural world (hereinafter referred to as the reference color reproduction range). In FIG. 8, a hue corresponding to an angle of 0° is reproduced by only yellow toner, a hue corresponding to an angle of 120° is reproduced by only magenta toner, and a hue corresponding to an angle of 240° is reproduced by only cyan toner.

Furthermore, a hue corresponding to an angle between 0° and 120° is reproduced by mixing the yellow toner and the magenta toner. Similarly, a hue corresponding to an angle between 120° and 240° is reproduced by mixing the magenta toner and the cyan toner. A hue corresponding to an angle between 240° and 0° is obtained by mixing the cyan toner and the yellow toner.

Figure 9:
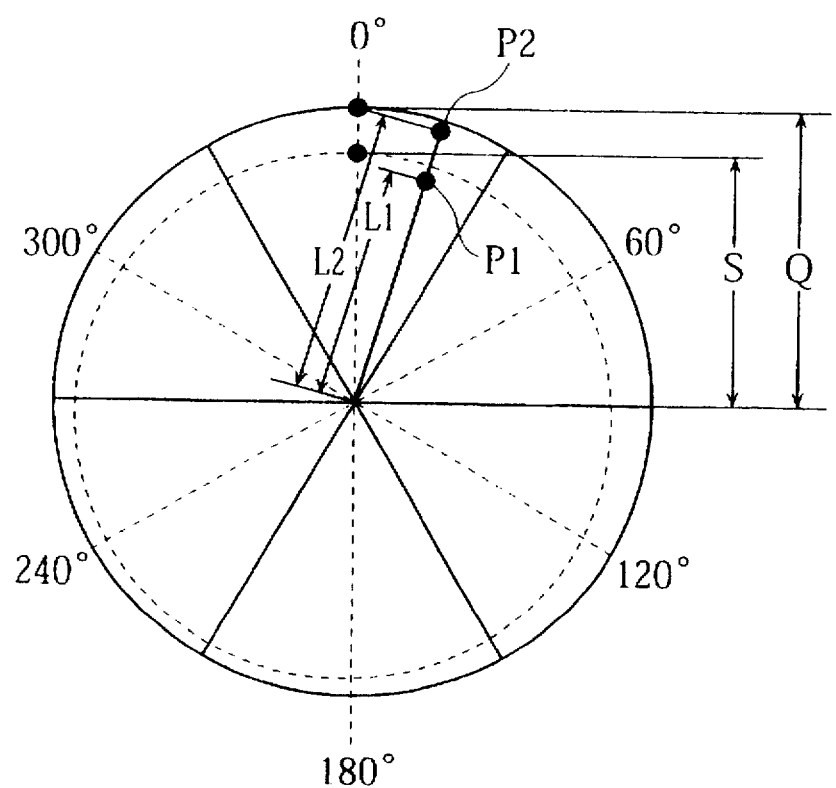
FIG. 9 is a typical diagram showing the color reproduction range corresponding to scanner characteristics.

FIG. 9 illustrates the reference color reproduction range shown in FIG. 8 and the color reproduction range corresponding to scanner characteristics. In FIG. 9, a circle indicated by a solid line represents the reference range, and a circle indicated by a broken line represents the color reproduction range corresponding to scanner characteristics.

When an actual image is read by a scanner, an actual color is a color at a point P2 in FIG. 9, while a color represented by a signal obtained from the scanner is a color at a point P1 in FIG. 9, for example. That is, the saturation of the color represented by the signal obtained from the scanner is made lower than that of the actual color. In this example, a color represented by the L*, a* and b* data obtained by the CMY/L*a*b* converting section 141 shall be the color at the point P1 in FIG. 9.

In the scanner characteristics correction processing section 142, the color represented by the signal obtained from the scanner (the color represented by the L*, a* and b* data obtained by the CMY/L*a*b* converting section 141) is converted into the actual color.

Description is made of processing by the scanner characteristics correction processing section 142.

In FIG. 9, scanner correction ratios $A_1$, and $A_6$ are previously found and stored for each of an angle in the center of the color reproduction range of yellow (0°), an angle in the center of the color reproduction range of red (600°), an angle in the center of the color reproduction range of magenta (120°), an angle in the center of the color reproduction range of blue (180°), an angle in the center of the color reproduction range of cyan (240°), and an angle in the center of the color reproduction range of green (300°).

For example, the scanner correction ratio $A_1$ corresponding to the angle in the center of the color reproduction range of yellow (0°) is found in the following manner. The ratio S/Q of the maximum value S of saturation in the color reproduction range considering scanner characteristics to the maximum value Q of saturation in the reference range at the angle of 0° is found as the scanner correction ratio $A_1$ corresponding to the angle of 0°. The scanner correction ratios $A_2$ to $A_6$ corresponding to the other angles are similarly found.

In the scanner characteristics correction processing section 142, an angle θ corresponding to the L*, a* and b* data obtained by the CMY/L*a*b* converting section 141 is calculated on the basis of the following equation (5):

$$\theta = \tan^{-1}(a/b) \qquad (5)$$

A scanner correction ratio A (θ) corresponding to the found angle θ is found on the basis of the above-mentioned six scanner correction ratios $A_1$ to $A_6$.

Specifically, when the found angle θ is 0°, 60°, 120°, 180°, 240°, or 300°, the scanner correction ratio ($A_1$ to $A_6$) corresponding thereto is a scanner correction ratio A (θ) corresponding to the found angle θ.

If the found angle θ satisfies 0°<θ<600°, the scanner correction ratio A (θ) is found on the basis of the following equation (6):

$$A(\theta) = \left\{ \frac{\theta}{60} \times (A_2 - A_1) \right\} + A_1 \qquad (6)$$

If the found angle θ satisfies 60°<θ<120°, the scanner correction ratio A (θ) is found on the basis of the following equation (7):

$$A(\theta) = \left\{ \frac{(\theta - 60)}{60} \times (A_3 - A_2) \right\} + A_2 \qquad (7)$$

If the found angle θ satisfies 120°<θ<180°, the scanner correction ratio A (θ) is found on the basis of the following equation (8):

$$A(\theta) = \left\{ \frac{(\theta - 120)}{60} \times (A_4 - A_3) \right\} + A_3 \qquad (8)$$

If the found angle θ satisfies 180°<θ<240°, the scanner correction ratio A (θ) is found on the basis of the following equation (9):

$$A(\theta) = \left\{ \frac{(\theta - 180)}{60} \times (A_5 - A_4) \right\} + A_4 \quad (9)$$

If the found angle θ satisfies 240°<θ<300°, the scanner correction ratio A (θ) is found on the basis of the following equation (10):

$$A(\theta) = \left\{ \frac{(\theta - 240)}{60} \times (A_6 - A_5) \right\} + A_5 \quad (10)$$

If the found angle θ satisfies 300°<θ<360°, the scanner correction ratio A (θ) is found on the basis of the following equation (11):

$$A(\theta) = \left\{ \frac{(\theta - 300)}{60} \times (A_1 - A_6) \right\} + A_6 \quad (11)$$

When the scanner correction ratio A (θ) corresponding to the angle θ is thus found, saturation L1 represented by the L*, a* and b* data found by the CMY/L*a*b* converting section 141 is converted into saturation L2 after correcting the scanner characteristics on the basis of the following equation (12):

$$L2 = L1 + A(\theta) \quad (12)$$

For example, data before correcting the scanner characteristics which is represented by the point P1 in FIG. 9 is converted into data after correcting the scanner characteristics (reference data) which is represented by the point P2 on the basis of the equation (6). The reference data (θ, L2) representing the point P2 thus obtained is sent to a printer characteristics correction processing section 143.

Figure 10:
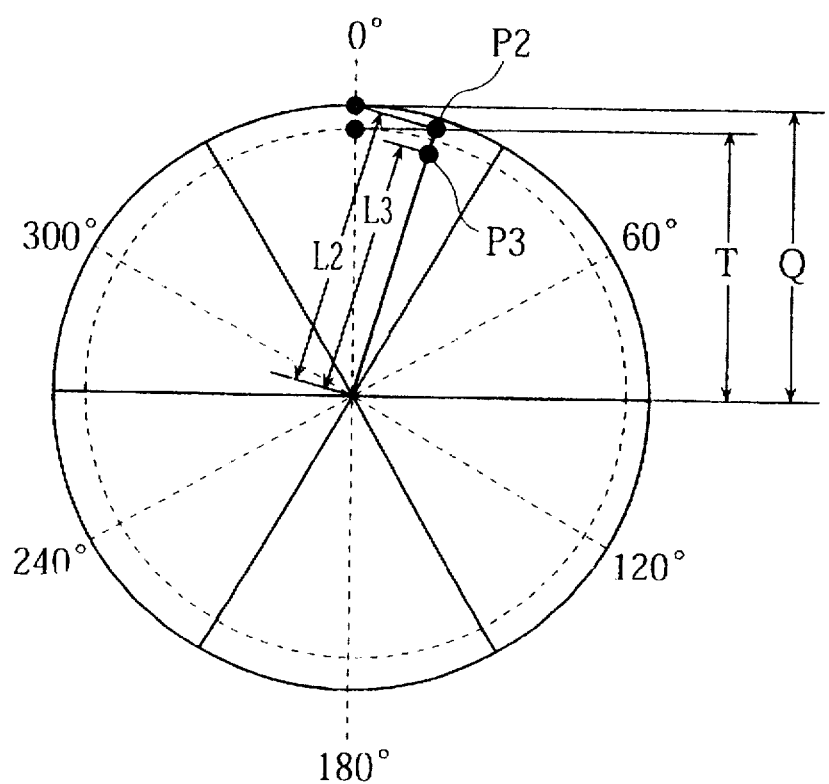
FIG. 10 is a typical diagram showing the color reproduction range corresponding to printer characteristics.

FIG. 10 illustrates the reference color reproduction range shown in FIG. 8 and the color reproduction range corresponding to printer characteristics (toner characteristics). In FIG. 10, a circle indicated by a solid line denotes the reference range, and a circle indicated by a broken line denotes the color reproduction range corresponding to printer characteristics.

It is assumed that a point represented by the data (θ, L2) sent from the scanner characteristics correction processing section 142 is a point P2 in FIG. 10. In this case, the point P2 is outside the color reproduction range, whereby a hue at the point P2 cannot be reproduced by this printer. In the printer characteristics correction processing section 143, data represented by the point P2 is converted into data, which corresponds to the same hue as the hue at the point P2, represented by a point corresponding to a point P3 within the color reproduction range of the printer.

Description is now made of processing by the printer characteristics correction processing section 143.

In FIG. 10, printer correction ratios $B_1$ and $B_6$ are previously found and stored for each of an angle in the center of the color reproduction range of yellow (0°), an angle in the center of the color reproduction range of red (60°), an angle in the center of the color reproduction range of magenta (120°), an angle in the center of the color reproduction range of blue (180°), an angle in the center of the color reproduction range of cyan (240°), and an angle in the center of the color reproduction range of green (300°).

For example, the printer correction ratio $B_1$ corresponding to the angle in the center of the color reproduction range of yellow (0°) is found in the following manner. The ratio T/Q of the maximum value T of saturation in the color reproduction range considering printer characteristics to the maximum value Q of saturation in the reference range at the angle of 0° is found as the printer correction ratio $B_1$ at the angle of 0°. The printer correction ratios $B_2$ to $B_6$ corresponding to the other angles are similarly found.

In the printer characteristics correction processing section 143, a printer correction ratio B (θ) corresponding to angle information θ sent from the scanner characteristics correction processing section 142 is found on the basis of the above-mentioned six printer correction ratios $B_1$ to $B_6$.

Specifically, when the angle θ is 0°, 60°, 120°, 180°, 240°, or 300°, the printer correction ratio ($B_1$ to $B_6$) corresponding thereto is a printer correction ratio B (θ) corresponding to the angle θ.

If the angle θ satisfies 0°<θ<α°, the printer correction ratio B (θ) is found on the basis of the following equation (13):

$$B(\theta) = \left\{ \frac{\theta}{60} \times (B_2 - B_1) \right\} + B_1 \quad (13)$$

If the angle θ satisfies 60°<θ<120°, the printer correction ratio B (θ) is found on the basis of the following equation (14):

$$B(\theta) = \left\{ \frac{(\theta - 60)}{60} \times (B_3 - B_2) \right\} + B_2 \quad (14)$$

If the angle θ satisfies 120°<θ<180°, the printer correction ratio B (θ) is found on the basis of the following equation (15):

$$B(\theta) = \left\{ \frac{(\theta - 120)}{60} \times (B_4 - B_3) \right\} + B_3 \quad (15)$$

If the angle θ satisfies 180°<θ<240°, the printer correction ratio B (θ) is found on the basis of the following equation (16):

$$B(\theta) = \left\{ \frac{(\theta - 180)}{60} \times (B_5 - B_4) \right\} + B_4 \quad (16)$$

If the angle θ satisfies 240°<θ<3000, the printer correction ratio B (θ) is found on the basis of the following equation (17):

$$B(\theta) = \left\{ \frac{(\theta - 240)}{60} \times (B_6 - B_5) \right\} + B_5 \quad (17)$$

If the angle θ satisfies 300°<θ<3600, the printer correction ratio B (θ) is found on the basis of the following equation (18):

$$B(\theta) = \left\{ \frac{(\theta - 300)}{60} \times (B_1 - B_6) \right\} + B_6 \quad (18)$$

When the printer correction ratio B (θ) corresponding to the angle θ is thus found, saturation L2 sent from the scanner characteristics correction processing section 142 is converted into saturation L3 within the color reproduction range corresponding to printer characteristics on the basis of the following equation (19):

$$L3 = L2 \times B(\theta) \quad (19)$$

Specifically, the data represented by the point P3 is found from the data represented by the point P2 in FIG. 10. Data (θ, L3) representing the point P3 thus obtained is converted into L*, a* and b* data, after which the L*, a* and b* data are sent to an L*a*b* /CMY converting section 144.

In the L*a*b* /CMY converting section 144, the L, a and b* data sent from the printer characteristics correction processing section 143 are converted into C, M and Y data corresponding thereto. The obtained C, M and Y data Cout, Mout and Yout are outputted from the color correcting section 104.

In the color correcting section shown in FIG. 7, data whose error caused by the characteristics of the scanner section is corrected is found, and C, M and Y data whose error caused by the characteristics of the printer is corrected are found from the data. When only the scanner section out of the scanner section and the printer section is changed, therefore, only the scanner correction ratio A may be changed depending on the characteristics of the scanner section, and the printer correction ratio B need not be changed.

On the contrary, when only the printer section out of the scanner section and the printer section is changed, the printer correction ratio B may be changed depending on the characteristics of the printer, and the scanner correction ratio A need not be changed.

Figure 11:
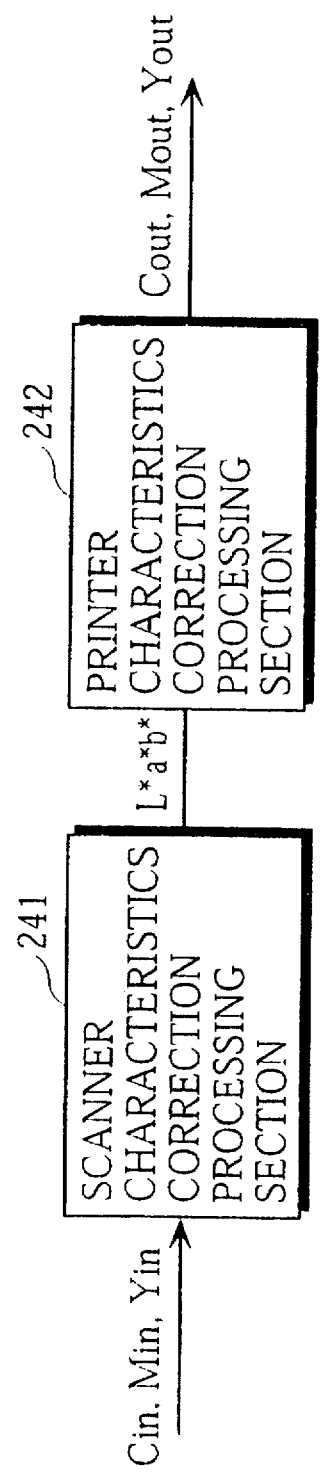
FIG. 11 is a block diagram showing another example of a color correcting section.

FIG. 11 illustrates another example of the color correcting section.

C, M and Y data inputted to the color correcting section are sent to a scanner characteristics correction processing section 241, where scanner characteristics correction processing is performed. A broken line shown in FIG. 9 represents the color reproduction range considering scanner characteristics in an L*a*b* space.

When an actual image is read by a scanner, an actual color is a color at a point P2 in FIG. 9, while a color represented by a signal obtained from the scanner is a color at a point P1 in FIG. 9. That is, the saturation of the color represented by the signal obtained from the scanner is made lower than that of the actual color.

In the scanner characteristics correction processing section 241, the C, M and Y data are so corrected that the color represented by the signal obtained from the scanner is changed into the actual color.

In the scanner characteristics correction processing section 241, the inputted C, M and Y data $C_{in}$, $M_{in}$ and $Y_{in}$ are converted into L*, a* and b* data whose error caused by the scanner characteristics is corrected. The CMY-L* a* b* conversion is made on the basis of the following equation (20):

$$L = \alpha_1 C_{in} + \beta_1 M_{in} + \gamma_1 Y_{in} + \delta_1 C_{in} M_{in} + \epsilon_1 M_{in} Y_{in} + \zeta_1 C_{in} Y_{in}$$

$$a = \alpha_2 C_{in} + \beta_2 M_{in} + \gamma_2 Y_{in} + \delta_2 C_{in} M_{in} + \epsilon_2 M_{in} Y_{in} + \zeta_2 C_{in} Y_{in}$$

$$b = \alpha_3 C_{in} + \beta_3 M_{in} + \gamma_3 Y_{in} + \delta_3 C_{in} M_{in} + \epsilon_3 M_{in} Y_{in} + \zeta_3 C_{in} Y_{in} \quad (20)$$

In the foregoing equation (20), $\alpha_i, \beta_i, \gamma_i, \delta_i, \epsilon_i$ and $\zeta_i$ (i=1, 2, 3) are set constants, the respective values of which are determined by the following experiments, for example. A standard original specified by L*, a* and b* (e.g., Color Target original conforming to ANSI IT8, 7/3-1993) or an original specified by L*, a* and b* measured using a color difference meter is read by a scanner. Each set of C, M and Y data thus obtained and L*, a* and b* corresponding thereto in the standard original are substituted into a conversion expression given by the foregoing equation (20), to find the best coefficients in the conversion expression using the method of least squares.

Consequently, L*, a* and b* data (reference data) representing the point P2 in FIG. 9 are obtained from the C, M and Y data corresponding to the point P1 in FIG. 9.

The reference data (L*, a* and b* data) obtained by the scanner characteristics correction processing section 241 are sent to the printer characteristics correction processing section 242.

In the printer characteristics correction processing section 242, the L*, a* and b* data sent from the scanner characteristics correction processing section 241 are converted into C, M and Y data using the following equation (21):

$$\begin{pmatrix} C_{out} \\ M_{out} \\ Y_{out} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} L \\ a \\ b \end{pmatrix} \quad (21)$$

In the equation (21), L*, a* and b* are input data, and $C_{out}$, $M_{out}$ and $Y_{out}$ are output data. $\alpha_{ij}$ (i=1, 2, 3, j=1, 2, 3) is a correction factor, the value of which is determined by the following experiments, for example. That is, a plurality of sets of C, M and Y data used as the basis are sent to the printer, to obtain an output image corresponding to each of the sets of C, M and Y data. L*, a* and b* data corresponding to each of the output images is found using a color difference meter (for example, CE-7000 (Trade Name) manufactured by Makubesu Co., Ltd.). L*, a * and b* data corresponding to the C, M and Y data are found, and the data are substituted into a conversion expression given by the foregoing equation (21), to find the best coefficients in the conversion expression using the method of least squares.

$C_{out}$, $M_{out}$ and $Y_{out}$ found by the foregoing equation (21) are outputted from the color correcting section 104.

In the color correcting section shown in FIG. 11, data whose error caused by the characteristics of the scanner section is corrected is found, and C, M and Y data whose error caused by the characteristics of the printer section is corrected are found from the data. When only the scanner section out of the scanner section and the printer section is changed, therefore, only the correction factor in the conversion expression (the equation (20)) for correcting the characteristics of the scanner section may be changed depending on the characteristics of a new scanner section, and the correction factor in the conversion expression (the equation (21)) for correcting the characteristics of the printer section need not be changed.

On the contrary, when only the printer section out of the scanner section and the printer section is changed, the correction factor in the conversion expression (the equation (21)) for correcting the characteristics of the printer section may be changed depending on the characteristics of the printer section, and the correction factor in the conversion expression (the equation (20)) for correcting the characteristics of the scanner section need not be changed.

As the color correcting section 104, a color correcting section which is constituted by the CMY/L*a*b* converting section 141 shown in FIG. 7, the scanner characteristics correction processing section 142 shown in FIG. 7, and the printer characteristics correction processing section 242 shown in FIG. 11 may be used. As the color correcting section 104, a color correction section which is constituted by the scanner characteristics correction processing section 241 shown in FIG. 11, the printer characteristics correction processing section 143 shown in FIG. 7, and the L*a*b*/CMY converting section 144 shown in FIG. 7 may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color correcting device connected to an input device and an output device comprising:
   first conversion means for converting input data composed of color data including a plurality of colors outputted by the input device into L*a*b* data, wherein the conversion corrects an error caused by the input device based on a first conversion expression, and second conversion means for converting the L*a*b* data from said first conversion means into output data including a plurality of colors, wherein the conversion corrects an error caused by the output device based on a second conversion expression; and wherein when the input device is replaced with another input device, only the first conversion means is changed to change the first conversion expression, and when the output device is replaced with another output device, only the second conversion means is changed to change the second conversion expression.

2. The color correcting device according to claim 1, wherein the first conversion expression is $$L^* = \alpha_1 C_{in} + \beta_1 M_{in} + \gamma_1 Y_{in} + \delta_1 C_{in} M_{in} + \epsilon_1 M_{in} Y_{in} + \zeta_1 C_{in} Y_{in}$$

$$a^* = \alpha_2 C_{in} + \beta_2 M_{in} + \gamma_2 Y_{in} + \delta_2 C_{in} M_{in} + \epsilon_2 M_{in} Y_{in} + \zeta_2 C_{in} Y_{in}$$

$$b^* = \alpha_3 C_{in} + \beta_3 M_{in} + \gamma_3 Y_{in} + \delta_3 C_{in} M_{in} + \epsilon_3 M_{in} Y_{in} + \zeta_3 C_{in} Y_{in}$$

where $\alpha_i$, $\beta_i$, $\gamma_i$, $\delta_i$, $\epsilon_i$, and $\zeta_i$ (i=1, 2, 3) are constants, $M_{in}$ represents Magenta, $Y_{in}$ represents Yellow, and $C_{in}$ represents Cyan.

3. The color correcting device according to claim 2, wherein the constants are determined based on a least squares method.

4. The color correcting device according to claim 1, wherein the second conversion expression is $$\begin{pmatrix} C_{out} \\ M_{out} \\ Y_{out} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} L^* \\ a^* \\ b^* \end{pmatrix}$$

where $\alpha_{ij}$ (i=1, 2, 3 and j=1, 2, 3) are the constants, $M_{out}$ represents Magenta, $Y_{out}$ represents Yellow, and $C_{out}$ represents cyan.

5. A color correcting method comprising the steps of:

converting input data including a plurality of colors into L*a*b* data to correct an error present in the input data based on a first conversion expression, converting the L*a*b* data into output data including a plurality of colors to correct an error that will result prior to being outputted by a output device based on a second conversion expression; and when a source of the input data is changed, changing only the first conversion expression, and when the output device is changed, changing only the second conversion expression.

6. The color correcting method according to claim 5, wherein the first conversion expression is $$L^* = \alpha_1 C_{in} + \beta_1 M_{in} + \gamma_1 Y_{in} + \delta_1 C_{in} M_{in} + \epsilon_1 M_{in} Y_{in} + \zeta_1 C_{in} Y_{in}$$

$$a^* = \alpha_2 C_{in} + \beta_2 M_{in} + \gamma_2 Y_{in} + \delta_2 C_{in} M_{in} + \epsilon_2 M_{in} Y_{in} + \zeta_2 C_{in} Y_{in}$$

$$b^* = \alpha_3 C_{in} + \beta_3 M_{in} + \gamma_3 Y_{in} + \delta_3 C_{in} M_{in} + \epsilon_3 M_{in} Y_{in} + \zeta_3 C_{in} Y_{in}$$

where $\alpha_i$, $\beta_i$, $\gamma_i$, $\delta_i$, $\epsilon_i$, and $\zeta_i$ (i=1, 2, 3) are constants, $M_{in}$ represents Magenta, $Y_{in}$ represents Yellow, and $C_{in}$ represents Cyan.

7. The color correcting method according to claim 5, wherein the second conversion expression is $$\begin{pmatrix} C_{out} \\ M_{out} \\ Y_{out} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} L^* \\ a^* \\ b^* \end{pmatrix}$$

where $\alpha_{ij}$ (i=1, 2, 3 and j=1, 2, 3) are the constants, $M_{out}$ represents Magenta, $Y_{out}$ represents Yellow, and $C_{out}$ represents Cyan.

8. The color correcting method according to claim 5, further comprising:

developing constants for the first conversion expression by:
inputting an original into an input device,
measuring the original for color differences,
inputting the numerical data outputted from the input device into $$L^* = \alpha_1 C_{in} + \beta_1 M_{in} + \gamma_1 Y_{in} + \delta_1 C_{in} M_{in} + \epsilon_1 M_{in} Y_{in} + \zeta_1 C_{in} Y_{in}$$

$$a^* = \alpha_2 C_{in} + \beta_2 M_{in} + \gamma_2 Y_{in} + \delta_2 C_{in} M_{in} + \epsilon_2 M_{in} Y_{in} + \zeta_2 C_{in} Y_{in}$$

$$b^* = \alpha_3 C_{in} + \beta_3 M_{in} + \gamma_3 Y_{in} + \delta_3 C_{in} M_{in} + \epsilon_3 M_{in} Y_{in} + \zeta_3 C_{in} Y_{in}$$

wherein L*, a*, and b* are based on the measured color differences, and solving for $\alpha_i$, $\beta_i$, $\gamma_i$, $\delta_i$, $\epsilon_i$, and $\zeta_i$ where i=1, 2, 3.

9. The color correcting method according to claim 5, further comprising:

developing constants for the second conversion expression by:
outputting multiple images each having a set of Cyan ($C_{out}$), Magenta ($M_{out}$), and Yellow ($Y_{out}$) data,
measuring corresponding L, a, and b data for each image,
substituting the above data into $$\begin{pmatrix} C_{out} \\ M_{out} \\ Y_{out} \end{pmatrix} = \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \begin{pmatrix} L \\ a \\ b \end{pmatrix},$$

and solving for $\alpha_{ij}$ where i=1, 2, 3 and j=1, 2, 3.

* * * * *